INVENTOR:
ALLAN JEPPSSON

3,422,525

Patented Jan. 21, 1969

---

3,422,525
MANUFACTURING TUBULAR DUCT SECTIONS
Allan Jeppsson, Jarna, Sweden, assignor to Aktiebolaget
Svenska Flaktfabriken, Stockholm, Sweden
Filed June 13, 1966, Ser. No. 557,022
U.S. Cl. 29—429                                    5 Claims
Int. Cl. B23p *19/00;* B21d *19/04*

ABSTRACT OF THE DISCLOSURE

A method of manufacturing tubular sections continuously in a sheet metal working machine, wherein a plurality of webs are advanced into edge-overlapping relation and are joined at the overlapping edge to form a composite web having a width corresponding to the desired length of duct section. The inner edges of the plural webs are folded and interlocked continuously with their advance and the outer edges of the composite web are formed into profiled flanges. The advancing composite web is intermittently sheared to provide plate blanks having a length corresponding to the circumference of the tubular duct, and, during the advance of the plate blanks from the shearing operation, the blanks are scored transversely and folded about a transverse axis to permit joining of the opposite ends of each blank into a tubular duct. The profiled flanges at the outer edges of the blank are cut out in registry with the score lines, so that the completed duct section has discontinuous profiled connecting flanges at each end thereof.

---

The present invention relates to a method for manufacturing tubular ducts, and particularly rectangular ducts intended for ventilation plant of the type shown in Swedish Patent No. 199,945 and U.S. Patent No. 3,199,901.

Up to the present time, rectangular ventilation ducts have been made of metal sheets of standard size, so-called sized plates. Accordingly, the length of the duct has been determined by the length of the plates, and in order to get a duct with a desired cross section, it has usually been necessary to interfold two or more plates along the side edges. Since the desired circumferential dimension of the duct normally is not an even multiple of the standard width of the plates, it has been necessary to cut one of the plates, resulting in an uneconomical waste of material. Furthermore, the existence of one or more folded joints along the side surfaces of the duct has rendered it more difficult to effect the upright bending of the end edges of the duct to produce connecting flanges, or to apply separate connecting flanges, for example, as shown in the aforementioned patent. The folded joints are rigid and produce an interruption in the otherwise plane plate surface, which also renders it difficult to provide a tight seal at such joints.

The present invention provides a method of continuously manufacturing ducts which has as its object to eliminate the drawbacks involved in the previously known methods of manufacturing. Such drawbacks include the waste of material involved when cutting the sized plates to width, and the manual labor involved in each working operation, for instance, cutting, folding, bending and joining, which require at least one and usually two men and are time consuming and necessitate a certain degree of scheduling and planning of the operations. Furthermore, the previous methods require that the connecting flanges be made separately from the duct and thereafter joined to the duct.

The present invention eliminates all of the foregoing drawbacks by providing a method wherein the metal webs are continuously advanced from storage rolls in parallel, edge-overlapping relation to a sheet metal working machine in which the plurality of webs are joined together into a composite web having a width corresponding to the length of the duct section, and the composite web is then cut into lengths corresponding to the desired circumference of the duct, so that the plate blanks formed in this manner may be bent about a transverse axis and the opposite ends joined to form a closed duct. The invention also permits the simultaneous formation of a number of pressed grooves, so-called stiffening rills, running parallel with the interfolded joints between the plurality of webs which form the composite web.

An embodiment will now be more fully described with reference to the accompanying drawings, wherein.

Figure 1:
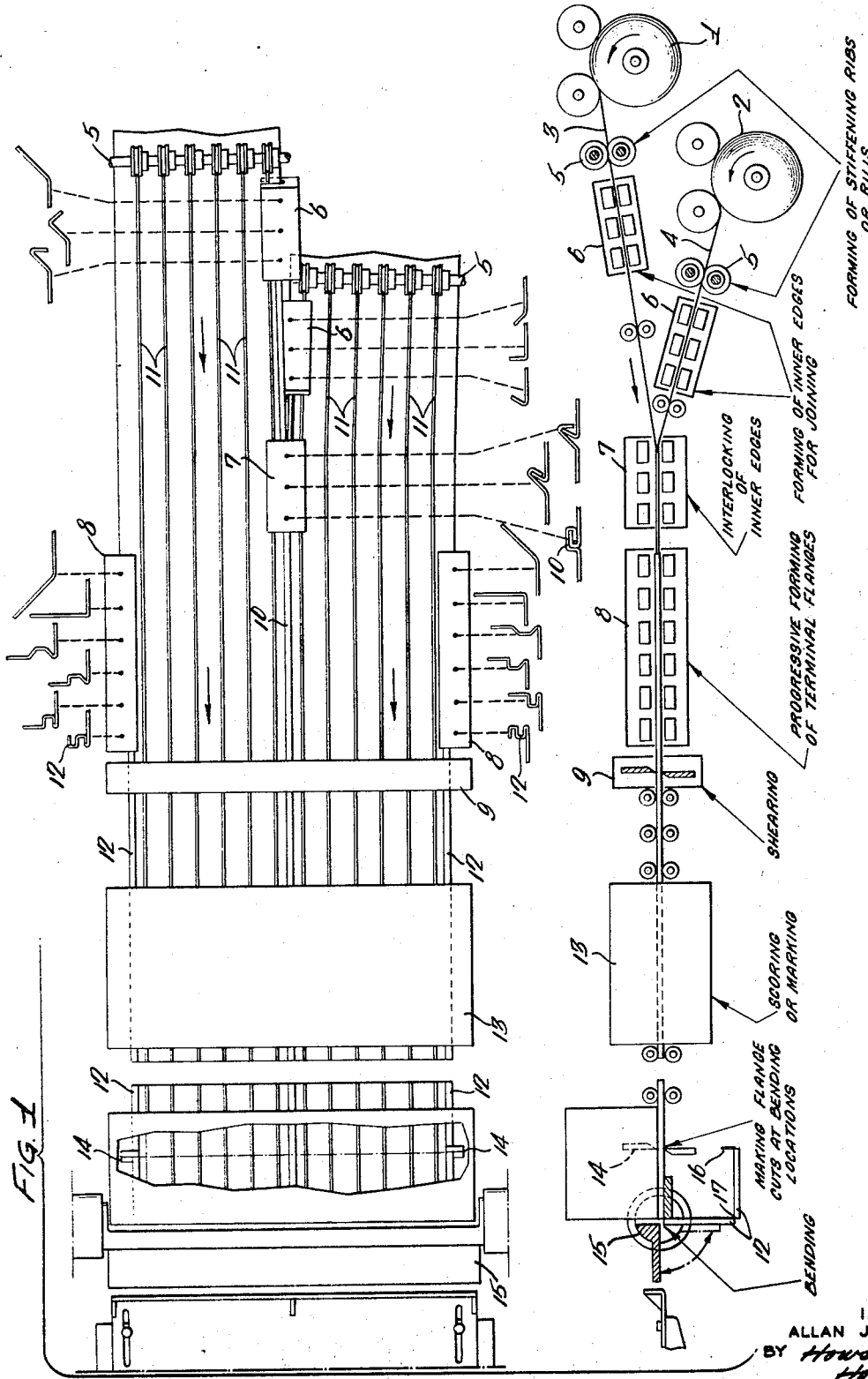
FIG. 1 is a partially schematic view showing a sheet metal working machine performing the steps of the method of present invention.

As illustrated in FIG. 1, the web-like material is fed from supply rolls 1 and 2 and advanced as separate webs 3 and 4 through a ribbing station 5 where the webs are provided with parallel grooves, so-called stiffening rills or ribs 11. The inner edges of the webs 3 and 4 overlap and are formed into folds at 6. The advancing folded inner edges are continuously interlocked and closed at 7 to produce an interfolded joint 10.

Figure 2:
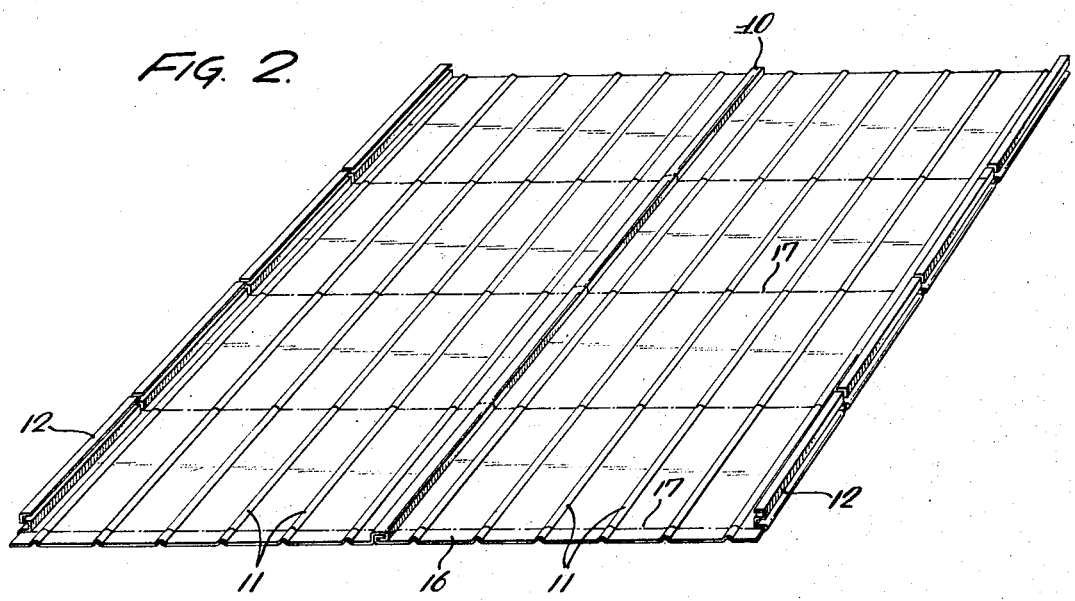
FIG. 2 is a perspective view of a plate blank prior to the bending operation.

In the next working operation in the sheet metal working machine, the outer edges of the composite web are formed at 8 step-by-step by means of rolls into profiled end flanges 12, after which the composite web is sheared or cut intermittently, as indicated at 9, to form plate blanks of the desired length. Following this shearing operation, each plate blank has a form as shown in FIG. 2. The joint 10 runs in the center of each plate blank and is provided with a series of stiffening rills or ribs 11 parallel thereto, the series extending from the joint 10 to the outer edge flanges 12. It will be noted that the flanges 12 conform substantially to the end flanges shown in the aforementioned patent. As shown in this patent and in FIG. 1, the end flange is provided with an abutment wall co-planar with the side edges of the composite web, perpendicular to and spaced from the plane of said web, having an inwardly offset wall between the abutment wall and the web to provide a sealing-strip groove, and terminating in an inwardly projecting lip remote from the plane of the composite web.

Figure 3:
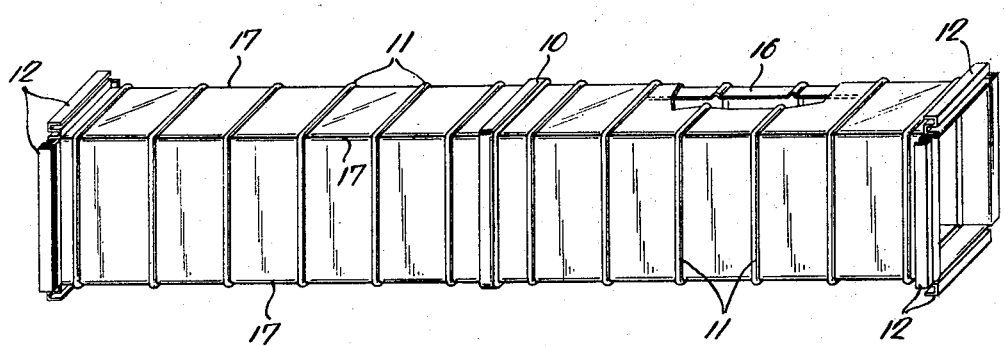
FIG. 3 is a perspective view of a completed duct section made in accordance with the present invention.

The formed blank is advanced from the shearing station 9 to a scoring station 13 which provides transverse score lines 17. After scoring or marking, the plate blank advances through a station where the flanges 12 are cut out, as indicated at 14, in registry with the score lines 17. At a bending station 15, the plate blank is bent along the score lines with 90° bends and the duct section is completed by joining the end edges at 16. (See FIG. 3.) The width of the composite web thus determines the length of the duct section, while the sheared length of the composite web determines the circumference of the duct section. Since each duct section can be made from a single plate blank, the side surfaces of the rectangular duct can be selected so that the joint 16 is located along one of the edges at the corner of the duct. This does not adversely affect the tight seal between the end flanges 12, as special sealing of the corners between the flanges is necessary under all circumstances.

While a particular embodiment of the present invention has been herein illustrated and described, it is not intended to limit the invention to such disclosure that changes and modifications may be made therein thereto within the scope of the following claims.

I claim:
1. A method of continuously manufacturing tubular duct sections having a given length, preferably intended for ducts in a ventilating plant, comprising the steps of:
   simultaneously and continuously advancing at least two sheet metal webs from axially-offset supply rolls for a subsequent positioning of said webs in edge-overlapping relation in a sheet-metal-working machine;
   continuously forming stiffening ribs in each advancing web in said machine, said ribs running parallel with the edges of the webs;
   continuously forming the inner edges of the advancing webs into folds for joining of said webs in said machine;
   continuously interlocking and closing said formed inner edges of the advancing webs in said machine to produce a composite web having a width corresponding to said given length;
   intermittently shearing said advancing composite web in said machine to provide plate blanks having a length corresponding to the circumference of the duct section; and
   bending the plate blanks about a transverse axis and securing the end edges together to form tubular duct sections.

2. A method according to claim 1 wherein said tubular duct sections are rectangular, including the step of scoring each plate blank to provide a series of transverse score lines:
   said bending step operable to effect 90° bends of said plate blanks on said score lines to thereby produce a rectangular duct section.

3. A method according to claim 2 including the step of continuously and progressively forming profiled terminal connecting flanges at the outer side edges of said composite web in said machine prior to shearing the same.

4. A method according to claim 3 including the step of cutting out said connecting flanges formed at the outer side edges of the composite web along said transverse score lines prior to said bending step whereby after said bending step said connecting flanges are discontinuous at said right angle bends of said rectangular duct section.

5. A method according to claim 4 wherein said profiled terminal connecting flanges comprise an abutment wall co-planar with the outer side edges of said composite web, and perpendicular to and spaced from the plane of said web with an inwardly offset wall therebetween, said wall terminating remote from the plane of the web in an inwardly projecting lip, the profiled flanges at the opposite side edges of the composite web being complementary, said profiled connecting flanges, after forming of said rectangular duct, operable to cooperate with the complementary profiled flanges of an adjoining duct section, upon abutment of the abutment walls of the two flanges, the inwardly offset walls forming a groove to receive a sealing strip of elastic material, and the inwardly projecting lips of the two flanges being adapted to be surrounded by a connecting member.

References Cited

UNITED STATES PATENTS

| | | | |
|---|---|---|---|
| 987,693 | 3/1911 | Von Borries | 138—159 |
| 2,636,541 | 4/1953 | Rutherford | 29—200 |
| 2,777,573 | 1/1957 | Goldsmith | 285—424 |
| 2,814,416 | 11/1957 | Campbell et al. | 113—120 |
| 2,825,384 | 3/1958 | Goldsmith | 29—243.5 X |
| 3,015,293 | 1/1962 | Parham | 113—54 |
| 3,189,991 | 6/1965 | Moore | 29—505 X |
| 3,197,850 | 8/1965 | Gracer | 29—243.5 |
| 3,199,901 | 8/1965 | Jeppsson | 285—424 X |

THOMAS H. EAGER, *Primary Examiner.*

U.S. Cl. X.R.

29—200; 113—54; 138—156; 285—424